United States Patent [19]

Yamaoka et al.

[11] Patent Number: 5,054,809
[45] Date of Patent: Oct. 8, 1991

[54] VARIABLE DAMPING CHARACTERISTICS SHOCK ABSORBER

[75] Inventors: Fumiyuki Yamaoka; Shinobu Kakizaki; Shigeru Kikushima, all of Kanagawa, Japan

[73] Assignee: Atsugi Unisia Corporation, Kanagawa, Japan

[21] Appl. No.: 440,215

[22] Filed: Nov. 22, 1989

[30] Foreign Application Priority Data

Nov. 25, 1988 [JP] Japan ................ 63-297774

[51] Int. Cl.⁵ ............ B60G 17/00; B60G 17/08; F16F 9/50
[52] U.S. Cl. .................... 280/707; 188/299; 280/709
[58] Field of Search ............ 280/707, 709, 711; 188/299, 317, 319; 267/64.11, 64.16, 64.26

[56] References Cited

U.S. PATENT DOCUMENTS

| | | | |
|---|---|---|---|
| 4,770,438 | 9/1988 | Sugasawa et al. ........ | 280/707 |
| 4,776,437 | 10/1988 | Ishibashi et al. ........ | 188/299 |
| 4,800,994 | 1/1989 | Imaizumi et al. ........ | 188/299 |
| 4,805,101 | 2/1989 | Dietrich et al. ........ | 280/707 |
| 4,809,179 | 2/1989 | Klinger et al. ........ | 280/707 |
| 4,815,575 | 3/1989 | Murty ........ | 188/299 |
| 4,819,772 | 4/1989 | Rubel ........ | 188/299 |
| 4,821,189 | 4/1989 | Hennecke et al. ........ | 280/707 |
| 4,830,398 | 5/1989 | Williams et al. ........ | 280/707 |
| 4,838,392 | 6/1989 | Miller et al. ........ | 280/707 |
| 4,852,863 | 8/1989 | Breitenbacher et al. ........ | 280/707 |
| 4,867,475 | 9/1989 | Groves ........ | 280/707 |
| 4,880,086 | 11/1989 | Knecht et al. ........ | 280/707 |
| 4,948,163 | 8/1990 | Kikushima et al. ........ | 280/707 |
| 4,949,989 | 8/1990 | Kakizaki et al. ........ | 280/707 |
| 4,961,483 | 10/1990 | Yamaoka et al. ........ | 188/299 |

FOREIGN PATENT DOCUMENTS 61-85210  4/1986  Japan .

Primary Examiner—Richard A. Bertsch
Attorney, Agent, or Firm—Ronald P. Kananen

[57] ABSTRACT

A variable damping characteristics shock absorber includes a piezoelectric unit which serves as a sensor for detecting piston stroke and an actuator for adjusting stiffness of a flow restriction valve and thus for adjusting the damping characteristics of the shock absorber. The shock absorber includes a pair of flow restriction valves, in which one of valve is active in response to a piston bounding stroke for generating damping force by restricting the fluid flow and the other is active in response to a piston rebounding stroke for generating a damping force by restricting fluid flow. The piezoelectric unit is disposed between two valves in such a manner that it may monitor piston strokes both in the bounding and rebounding stroke directions and adjust stiffness of both of the flow restriction valves.

4 Claims, 4 Drawing Sheets

VARIABLE DAMPING CHARACTERISTICS SHOCK ABSORBER

BACKGROUND OF THE INVENTION

1. Field of the Invention

The present invention relates generally to a variable damping characteristics shock absorber for an automotive suspension system, which has variable operational modes for adapting vehicular suspension characteristics to a vehicle driving condition. More specifically, the invention relates to a shock absorber which has a compact sensor and an actuator mechanism for monitoring the vehicular body vibration mode and the switching operational mode in order to achieve both riding comfort and driving stability of the vehicle.

2. Description of the Background Art

In the recent automotive technologies, respective automotive components have required high performance and high responsiveness. In the case of a suspension system, it has been a high level of riding comfort and driving stability has been required. In order to achieve both the high level of riding comfort and the high level of driving stability, a high response against vibration input to the suspension system has been required.

One of the typical variable damping force suspension systems is disclosed in Japanese Patent First (unexamined) Publication (Tokkai) Showa 61-85210. In the disclosed system, a piezoelectric element is disposed in each shock absorber in each suspension system for detecting the variation of fluid pressure in the shock absorber. A control unit is provided for receiving an input indicative of the fluid pressure provided from the piezoelectric element. The control unit outputs a controlled voltage to the piezoelectric element for switching the operation mode of the shock absorber at least between a SOFT mode, in which a smaller damping force is to be generated in response to vibration input, and a HARD mode, in which greater damping force is to be generated in response to vibration input.

In general, the control unit is responsive to low frequency input vibration which induces an attitude change of the vehicle body to switch the operational mode of the shock absorber into the HARD mode for a given period of time. While the shock absorber is maintained at the HARD mode, the piezoelectric element maintains operation as an actuator for maintaining a HARD mode operation of the shock absorber. Such manner of control of the suspension characteristics may be effective in terms of suppression of vehicular attitude change, such as rolling and/or pitching. However, on the other hand, even in response to road shock input from a vehicular wheel, it is also desirable to adjust the suspension characteristics depending upon the nature of the road shock in order to satisfactorily achieve both riding comfort and driving stability. Therefore, the prior proposed variable damping characteristics suspension systems for automotive vehicles are not at all satisfactory.

Furthermore, in the prior proposed system, while it is active as the actuator, the piezoelectric element cannot monitor fluid pressure.

In the modern technology of suspension control, it has been considered that the varying of damping characteristics of shock absorber between a piston compression stroke in response to a bounding motion between the vehicle body and a road wheel and a piston expansion stroke in response to a rebounding motion between the vehicle body and the road wheel in order to obtain better vibration stabilizing performance is required. Therefore, it is desirable to adjust the damping characteristics of the shock absorber depending upon the mode of piston action. In order to realize this adjustment, it is essential to detect the piston action mode on the basis of the variation of the fluid pressure in the shock absorber. However, as set forth above, the piezoelectric element is held inoperative as the fluid pressure sensing element, while the shock absorber is maintained in the HARD mode.

This may cause a problem in damping shocks. For example, when the damping characteristics in the HARD mode are set to generate a relatively great damping force in response to vibration input, the damping force generated in response to the piston compression mode action can amplify the input vibration. This tendency may be significant for the second and subsequent vibration cycles. This clearly degrades the vibration stabilizing performance of the vehicle to provide a feeling of a rough ride.

In addition, in the prior proposed suspension system operates substantially a passive manner to detect the input vibration based the variation of the fluid pressure in the shock absorber. Namely, until the vehicle driving condition is changed to require switching of the suspension characteristics, the suspension system will never operate to switch suspension characteristics. Therefore, when a criterion of the fluid pressure to switch the suspension mode from the SOFT mode to the HARD mode is set at a relatively high value in order to provide better riding comfort, the switch from the SOFT mode to the HARD mode tends to be delayed causing bottoming due to low response characteristics, particularly at the initial stage of the switching of suspension mode.

In view of the shortcoming or drawback in the prior art, the co-pending U.S. patent application Ser. Nos. 337,349, 340,062, 359,091, now U.S. Pat. No. 4,948,163, and 388,006 respectively filed on Apr. 13, 1989, Apr. 18, 1989, May 30, 1989 and Aug. 1, 1989, and assigned to the common assignee of the present invention, propose variable damping characteristics shock absorbers which can solve the foregoing problems in the prior art. These prior proposed shock absorbers resolve most of the shortcoming and drawback in the prior art and are thus effective for using in the automotive suspension system.

For prior proposed shock absorbers, it is further desirable to reduce the size and complexity for facilitating more compact units so as to expand the applicability of the shock absorber for greater variation of vehicular suspension structures.

SUMMARY OF THE INVENTION

Therefore, it is an object of the present invention to provide a compact actuator and sensor construction which enables a variable damping characteristics shock absorber made satisfactorily compact.

In order to accomplish aforementioned and other objects, a variable damping characteristics shock absorber, according to the present invention, includes a piezoelectric unit which serves as a sensor for detecting piston stroke and an actuator for adjusting stiffness of a flow restriction valve and thus for adjusting damping characteristics of the shock absorber. The shock absorber includes a pair of flow restriction valves, in which one of valve is active in response to piston bounding stroke for generating damping force by restricting fluid flow and the other is active in response to piston rebounding stroke for generating a damping force by restricting the fluid flow. The piezoelectric unit is disposed between the two valves in such a manner that it may monitor the piston strokes both in bounding and rebounding stroke directions and adjust the stiffness of both of the flow restriction valves.

According to one aspect of the invention, a variable damping characteristics shock absorber comprises:

a hollow cylinder filled with a working fluid;

a piston thrustingly disposed within the internal space of the hollow cylinder for dividing the internal space into first and second fluid chambers, the piston defining a first fluid flow path for fluid communication between the first and second fluid chambers during a piston compression stroke and a second fluid flow path for fluid communication between the first and second fluid chambers during a piston expansion stroke;

a first flow restriction valve associated with the first fluid flow path for restricting fluid flow therethrough and for generating a first damping force against the piston compression stroke;

a second flow restriction valve associated with the second fluid flow path for restricting fluid flow therethrough and for generating a second damping force against the piston expansion stroke;

a piezoelectric actuator disposed between the first and second flow restriction valves for adjusting the magnitude of flow restriction for the fluid flow through the first and second fluid flow path depending upon a level of a control signal applied thereto; and a controller means for deriving the level of the control signal for controlling damping characteristics at a desired damping characteristic.

The piezoelectric actuator may produce a pressure indicative signal representative of a fluid pressure in one of the first and second fluid chambers of a higher pressure, and the controller means receives the pressure indicative signal for detecting the mode of vibration in each vibration cycle and derives the control signal level adapted to the detecting vibration mode.

The variable damping characteristics shock absorber may further comprise first and second biasing means respectively associated with the first and second flow restriction valves for resiliently loading the biasing force for placing the first and second flow restriction valves to the closed position in which the fluid communication through the first and second fluid path is blocked, and the piezoelectric actuator is active, in the active state, for exerting actuation forces for the first and second flow restriction valves in directions opposite to the directions of the biasing force of the first and second biasing means. In such case, the first and second biasing means may be associated with the first and second adjusting means so that the biasing forces to be exerted to the first and second flow restriction valves is adjusted by means of the first and second adjusting means.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
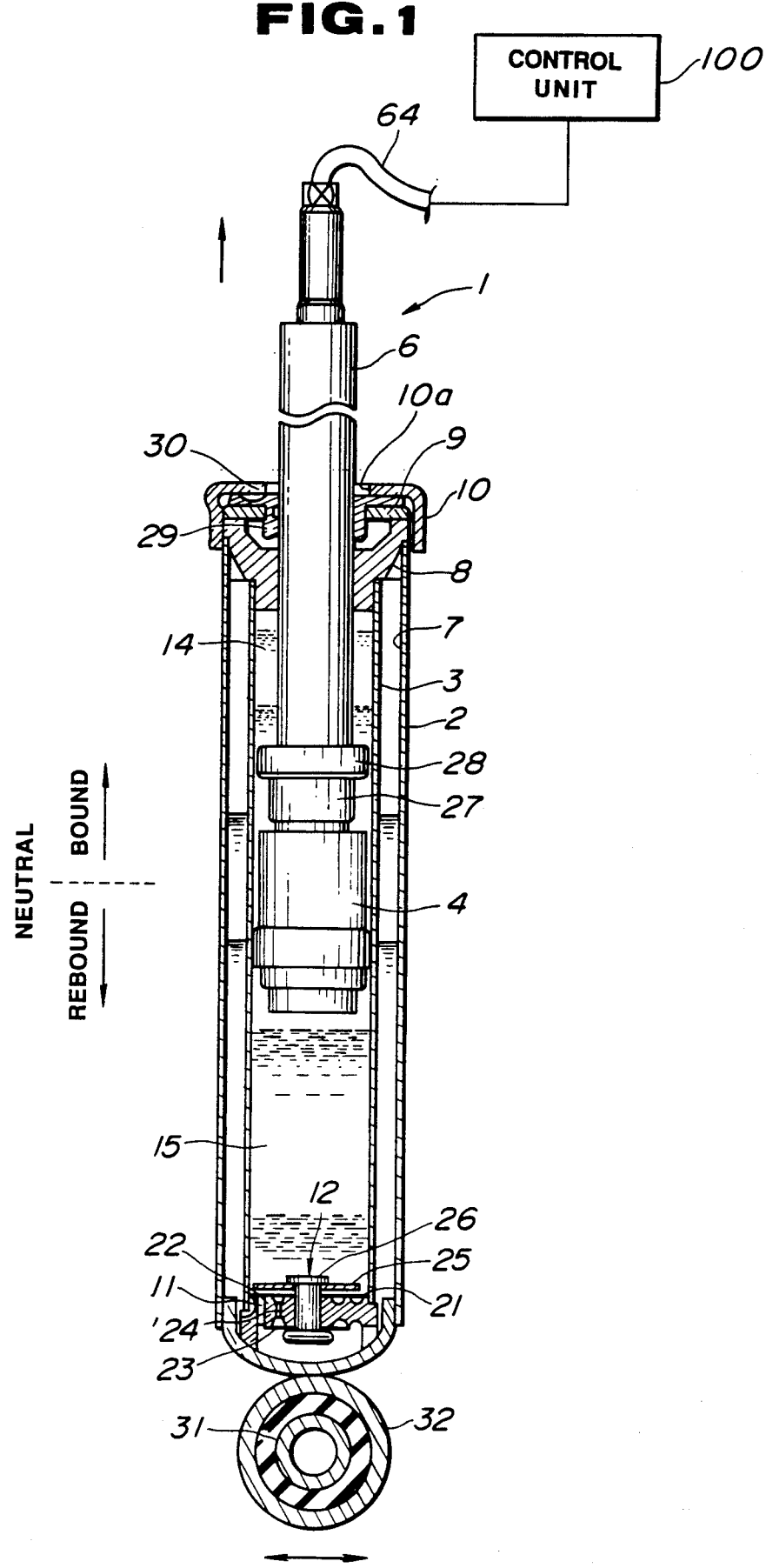
FIG. 1 is a section of preferred embodiment of a variable damping force shock absorber according to the present invention, which is associated with a control unit implementing a preferred process of suspension control.

Referring now to the drawings, particularly to FIG. 1, the preferred embodiment of a shock absorber, according to the present invention, serves as a principle component of the preferred embodiment of an automotive suspension system, according to the invention. The shown shock absorber 1 comprises a double action type shock absorber with variable damping characteristics. The shock absorber 1 has inner and outer cylinder tubes 3 and 2. The inner and outer cylinder tubes 3 and 2 are arranged in coaxial arrangement for defining an annular chamber 7 which serves as a reservoir chamber.

A piston assembly 4 is disposed within the internal space of the inner cylinder tube 3 for dividing the internal space into upper and lower working chambers 14 and 15. The piston assembly 4 is supported on the lower end of a piston rod 6. The piston rod 6 is a guided by a rod guide 8 which is engaged in the top end opening of the inner cylinder tube 3. The rod guide 8 cooperates with a piston seal 9 and a stopper plate 10 to form an upper plug assembly for sealingly closing the top ends of the inner and outer cylinder tubes 3 and 2.

The top end of the piston rod 6 is connected to a vehicle body (not shown) in a per se known manner. On the other hand, a connecting eye 32 with an eye bushing 31 is provided on the lower end of the outer cylinder tube 2. The outer cylinder tube 2 is connected to a suspension member (not shown) rotatably supporting a road wheel. The shock absorber 1 is thus disposed between the vehicle body and the suspension member to receive vibration energy causing relative displacement between the vehicle body and the suspension member. The shock absorber 1 is compressed in response to a bounding stroke motion, in which the vehicle body and the suspension member are shifted to approach to each other, and expanded in response to a rebounding stroke motion, in which the vehicle body and suspension member are shifted away from each other. In response to the bounding stroke motion of the vehicle body and the suspension member, the piston assembly 4 strokes in a compression stroke direction while compressing the lower working chamber 15. This causes the working fluid pressure in the lower working chamber to increase and the working fluid pressure in the higher working chamber to decrease. On the other hand, in response to the rebounding stroke motion of the vehicle body and the suspension member, the piston assembly 4 strokes in the expansion stroke direction while compressing the higher working chamber 14. Therefore, the fluid pressure in the upper working chamber 14 is increased and the fluid pressure in the lower working chamber 15 is decreased. The fluid reservoir chamber 7 is normally maintained at a pressure substantially corresponding to the fluid pressure in the lower working chamber 15.

The lower end opening of the inner cylinder 3 is closed by a bottom valve assembly 12 which defines a communication path 11. The bottom valve assembly 12 thus establishes fluid communication between the fluid reservoir chamber 7 and the lower working chamber 15.

The bottom valve assembly 5 has a check valve 21 associated with a port 22 for openably closing the port. The check valve 21 is designed to open during the piston expansion stroke to permit fluid flow from the reservoir chamber 7 to the lower working chamber 15. The bottom valve 5 is also provided with a compression valve 23 which is associated with the lower end of an orifice 24 to open in response to the compression stroke in order to establish the fluid communication from the lower working chamber 15 to the reservoir chamber 7. The check valve 21 and the compression valve 23 are mounted and secured on a bottom valve body 12 by means of a clamping pin 26. A stopper plate 25 is also mounted on the bottom valve body 12 in order to restrict the magnitude of the opening of the check valve 21. With the shown construction, the check valve 21 is responsive to the pressure difference between the lower working chamber 15 and the fluid reservoir chamber 7 to be shifted to the open position for introducing the working fluid in the fluid reservoir chamber, into the lower working chamber 15. On the other hand, during the piston compression stroke, pressure difference between the lower working chamber 15 and the fluid reservoir chamber 7 is created to shift the compression valve 23. By opening the compression valve 23, a limited flow rate of the working fluid is permitted to flow from the lower working chamber 15 to the fluid reservoir chamber 7 while generating a damping force.

A rebounding stopper 28 which is made of an elastic material, such as a rubber, is mounted on the piston rod 6 by means of a retainer 27. The rebounding stopper 28 protects the piston assembly 4 from direct collision onto the lower end of the rod guide 8.

The stopper plate 10 is clamped onto the upper end of the outer cylinder tube 2. The stopper 10 defines a center opening 10a, through which the piston rod 6 extends. A rubber bushing (not shown) engages with the periphery of the center opening 10a of the stopper plate 10 to slidingly and sealingly guide the piston rod 6. A main lip 29 and a dust lip 30 are also provided in the upper plug assembly. The main lip 29 sealingly contacts with the outer periphery of the piston rod for establishing a fluid tight seal. On the other hand, the dust lip 30 is provided in the vicinity of the stopper plate 10 and contacts with the outer periphery of the piston rod 6 to establish a fluid tight seal so as to prevent entry of muddy water, dust and so forth.

The piston assembly 4 is designed to vary the damping characteristics to generate the damping force in response to the vibration input according to the variable characteristics in a different damping mode. In order to control the damping mode of the piston assembly 4, a control unit 100 is connected to the piston assembly via a harness 35 which extends through the piston rod.

Figure 2:
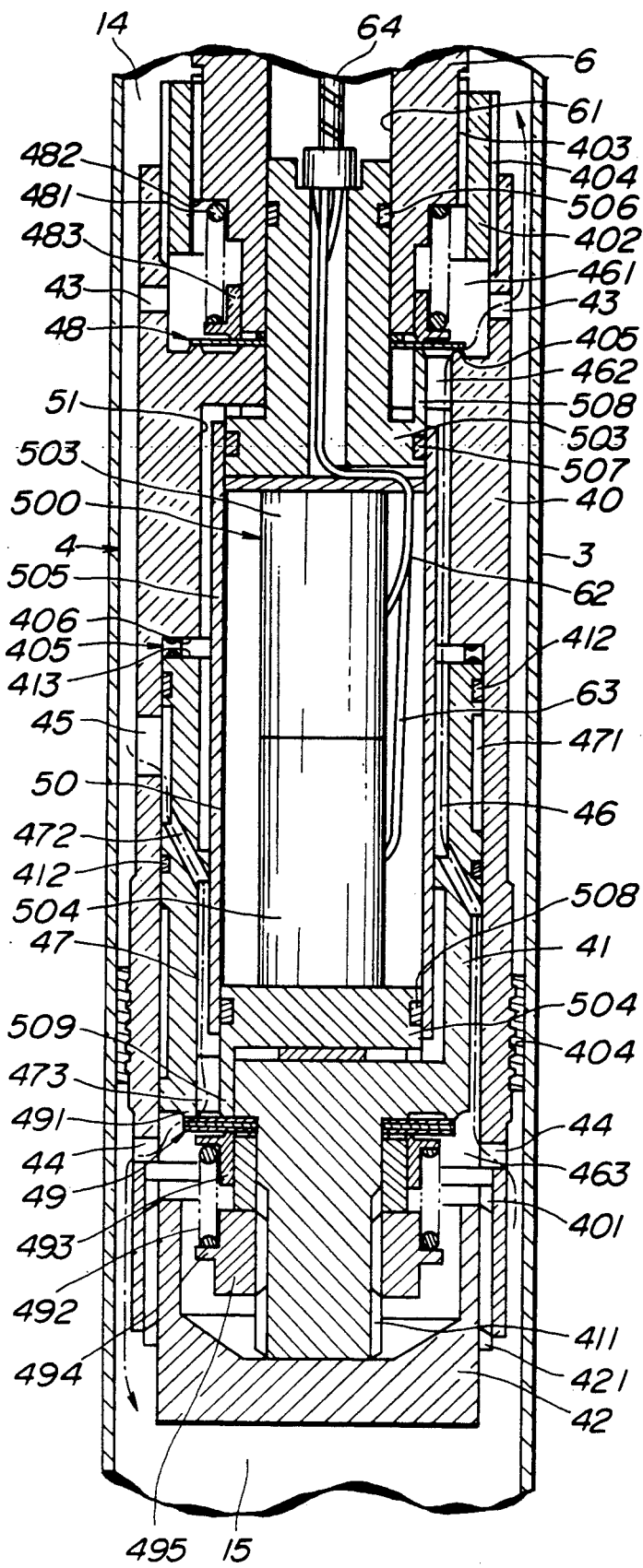
FIG. 2 is an enlarged section of the major part of the preferred embodiment of the variable damping force shock absorber, according to the invention.

As shown in detail in FIG. 2, the piston assembly 4 comprises an cylindrical piston body 40 and an inner piston body 41 disposed within the internal space of the outer piston body in a coaxial arrangement. The outer piston body 40 has a lower end portion having a threaded inner periphery 401. A bottom cup 42, having an threaded outer periphery 421, engages with the lower end portion of the outer piston body 40. On the other hand, top end of the outer piston body 40 is threadingly engaged with the lower end of the piston rod 6 via a coupling ring 402 which has inner and outer threads 403 and 404 respectively engaged with the outer thread on the lower end of the piston rod 6 and the upper end of the outer piston body 40.

Between the mating peripheries of the outer and inner piston bodies 40 and 41, sealing rings 412 are provided for providing a fluid tight seal therebetween. On the other hand, a lubricating seal ring 404 is provided on the outer periphery of the outer piston body 40 for establishing a fluid tight seal and thereby separating upper and the lower fluid chambers 14 and 15. An assist spring 405 is disposed between the axially oriented edges 406 and 413 of the outer and inner piston bodies 40 and 41 in order to axially bias the outer and inner piston bodies 40 and 41 in directions away from each other.

The cylindrical piston body 40 defines upper radial orifices 43 opening to the upper fluid chamber 14 and lower radial orifices 44 opening to the lower fluid chamber 15. The outer piston body 40 further defines a radial opening 45 opening to the upper fluid chamber 14. The upper radial orifices 43 and the lower radial orifices 44 communicate via a fluid path 46 defined through the piston 4. In addition, another fluid flow path 47 is defined through the piston 4 for fluid communication between the radial opening 45 and the lower radial orifices 44. The fluid path 46 includes an upper annular chamber 461 defined between the piston rod 6 and the outer piston body 40, to which the inner ends of the upper radial orifices 43 open, an upper port 462 opening to the upper annular chamber 461, a lower annular chamber 463 defined between the lower end of the outer piston body 40 and the bottom cup 42, to which the lower radial orifices 44 open, and a lower port 464 opening to the lower annular chamber. The fluid path 47 includes an annular chamber 471 defined by the circumferentially-extending groove formed on the inner piston body 41, an upper port 472 opening to the annular chamber 471 and a lower port 473 opening to the lower annular chamber 463.

The upper port 462 of the fluid flow path 46 is openably closed by a disc-type upper flow restriction valve member 48 which is made of a leaf spring and is per se pre-loaded to resiliently seat on an annular land 405 extending circumferentially and oriented immediate outside of the outer circumferential edge of the upper port 462. In addition, the upper flow restriction valve member 48 is loaded by a bias spring 481, which is seated on the step 482 of the piston rod 6 at its upper end, and on a movable spring seat member 483 contacting with the upper flow restriction valve member. The magnitude of the pre-load provided by the bias spring 481 can be adjusted by adjusting the tightening magnitude when the outer piston body 40 is threaded onto the piston rod 6 via the coupling ring 402. Similarly, the lower port 473 of the fluid flow path 47 is openably closed by means of a disc-type lower flow restriction valve member 49. The lower flow restriction valve member 49 is per se pre-loaded toward an annular land 491 circumferential extending through the outer edge of the lower port 473. In addition, the lower flow restriction valve member 49 is loaded by means of a bias spring 492, one end of which is seated on an upper movable seat member 493 and the other end of which is seated on a spring seat portion 494 of an adjuster nut 495. The adjuster nut 495 is engaged to the lower thread portion 411 of the inner piston body 41 and thus adjusts the magnitude of spring force to be exerted on the flow restriction valve member 49 by adjusting the tightening magnitude thereof.

By the outer and inner piston bodies 40 and 41 assembled, an axially-extending space 51 is defined for receiving therein a damping characteristic adjusting mechanism which is generally represented by the reference numeral 50. The adjusting mechanism 50 generally comprises a piezoelectric unit 500, including an upper piezoelectric element 501 and a lower piezoelectric element 502, and upper and lower actuating members 503 and 504, which respectively cooperate with one of the associated piezoelectric elements. The upper and lower piezoelectric elements 501 and 502 are housed within a sleeve 505 which is formed into a cylindrical configuration. As can be seen, the upper actuating member 503 carries upper and lower sealing rings 506 and 507, respectively contacting with the inner peripheries of the bore 61 formed through the piston rod 6 and the cylindrical sleeve 505. With the upper sealing ring 506, the interior of the bore 61 is sealed in a liquid tight fashion. On the other hand, the lower sealing ring 507 seals the upper end of the sleeve 505. The actuating means 504 carries a sealing ring 508 creating a liquid tight seal for the lower end of the sleeve 505. Therefore, with the sealing rings 507 and 508, a liquid tight seal is established for isolating the interior of the sleeve 505 from the working fluid flowing through the piston.

However, if desired, the sleeve and the seal can be removed for exposing the piezoelectric unit 50 to the working fluid.

The actuating members 503 and 504 are associated with the respective piezoelectric elements 501 and 502 via electrically insulative members 511 and 512. The actuating members 503 and 504 are respectively provided with axial extensions 508 and 509 respectively contacting with the associated upper and lower flow restriction valve members 48 and 49.

The piezoelectric elements 501 and 502 of the piezoelectric unit 500 are connected to the control unit 100 via wire harnesses 62 and 63 and a cable 64 which extends through the bore 61 of the piston rod 6. Each of the piezoelectric elements 501 and 502 comprises a plurality of thin disc-shaped piezoelectric plates stacked in series. Each of the piezoelectric plates respectively has a pair of electrodes. As is well known, when a voltage is applied to such piezoelectric plates electrodistortion are caused expanding and contacting the axial length. The magnitude of electrodistortion is variable, depending upon the magnitude of voltage applied to the piezoelectric plates. Such electrodistortion may cause mechanical distortion of the piezoelectric element to cause variation of the axial length.

On the other hand, when the fluid pressure is applied to the piezoelectric elements 501 and 502, each of the piezoelectric plate, as the components of the piezoelectric elements causes mechanical distortion for producing an electric power. The magnitude of the electric power to be generated by the piezoelectric elements 501 and 502 is variable, depending upon the magnitude of the mechanical distortion and thereby corresponding to the magnitude of the pressure exerted on the piezoelectric elements. In the practical construction, the piezoelectric elements 501 and 502 of the piezoelectric unit 500 are subject to fluid pressure of the annular chamber 463 exerted on the lower flow restriction valve member 74 which corresponds to the fluid pressure in the lower working chamber 15, via the slider. The piezoelectric unit 500 thus produces a pressure indicative signal Vs. On the other hand, the piezoelectric unit 500 is also subject to fluid pressure in the upper annular chamber 461 exerted on the valve member 48, which fluid pressure corresponds to that in the upper fluid chamber 14. The piezoelectric unit 500 thus produces the pressure indicative signal Vs. As will be appreciated, the magnitude of the pressure indicative signal Vs is variable, depending upon the magnitude of pressure in the upper and lower working chambers 14 and 15.

The piezoelectric unit 500 feeds the compression mode pressure indicative signal Vs to the control unit 100. The control unit 100 processes the pressure indicative signal Vs to produce a control signal Vc. The control signal Vc is fed to the piezoelectric unit 500 for controlling the axial length thereof to adjust the stiffness of the flow restriction valve members 48 and 49. Namely, as can be seen from FIG. 2, since the piezoelectric unit 500 serves to expand the axial length thereof in a magnitude corresponding to the magnitude (or voltage) of the control signal for exerting the force in directions opposite to the bias springs 481 and 492, the load at the upper and lower flow restriction valve members 48 and 49 is reduced by actuation of the piezoelectric unit 500. As a result, the magnitude of the flow restriction of the flow restriction valve members 48 and 49 is reduced. Therefore, the damping characteristics of the shock absorber can be softened by actuation of the piezoelectric unit 500.

Figure 3:
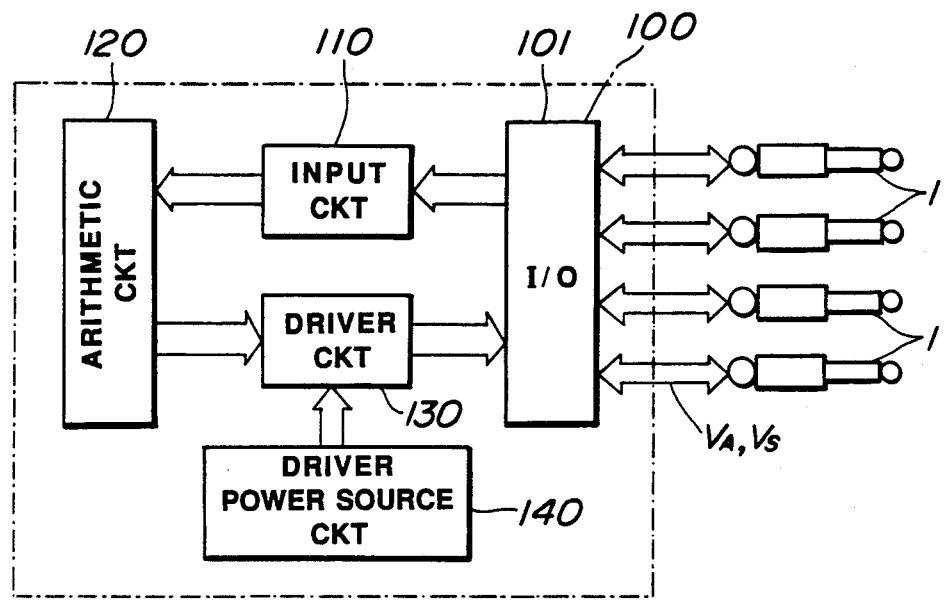
FIG. 3 is a block diagram of the control unit employed in the preferred embodiment of an automotive suspension system and designed for implementing the preferred suspension control process.

As shown in FIG. 3, the control unit 100 comprises a microprocessor based circuit, including an input/output (I/O) port 101, an input circuit 110, an arithmetic circuit 120, a driver circuit 130 and a driver power source circuit 140. The I/O unit 101 is connected to respective damping control mechanisms 70 of the shock absorbers 1 disposed in the front-left, front-right, rear-left and rear-right suspension systems via the wire harness 62 and 63 of the cable 64. The pressure indicative signal Vs generated by the piezoelectric unit 500 of the respective shock absorbers 1 are inputted to the control unit 100 through the I/O port 101. The I/O unit 101 has a plurality of control channels respectively adapted to control the piezoelectric unit 500 in the respective shock absorbers 1 of the front-left, front-right, rear-left and rear-right suspension systems.

Figure 4A:
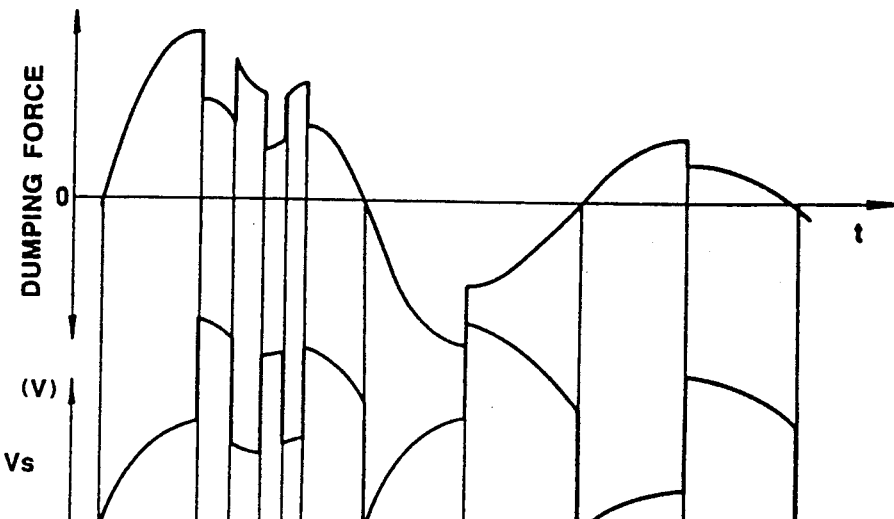
FIG. 4 is a timing chart showing the variation of the suspension mode in relation to the variation of the damping force to be generated in the shock absorber.
Figure 4B:
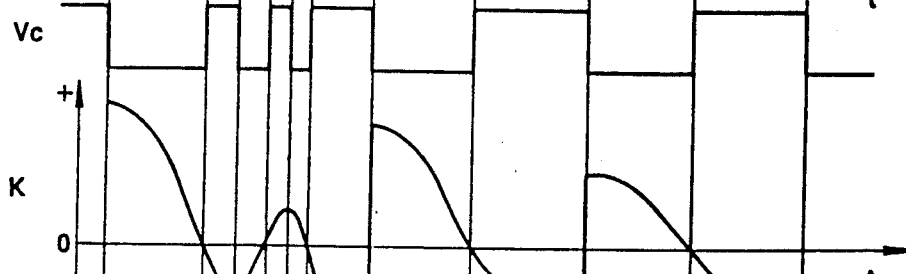
Figure 4C:
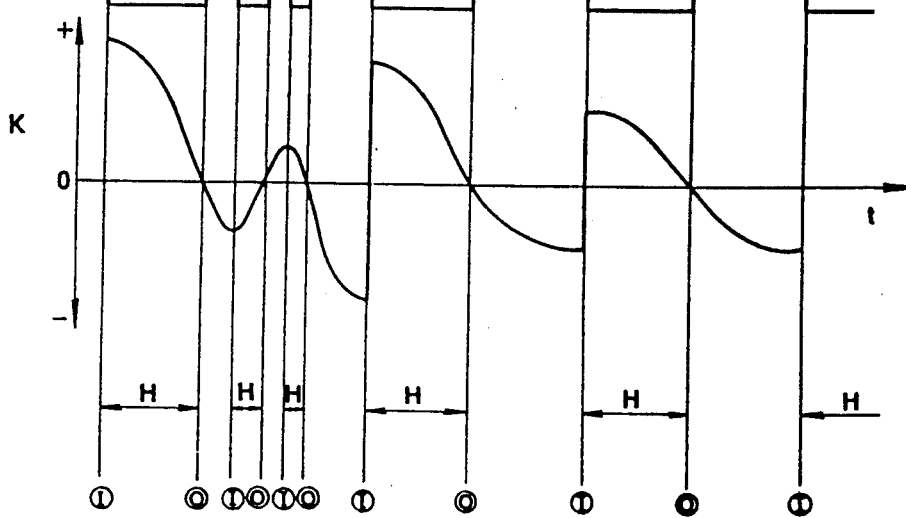

As shown in FIG. 4, the fluid pressure in the upper working chamber 14 is monitored by the piezoelectric unit 500 during the piston expansion stroke. The piezoelectric unit 500 thus produces the pressure indicative signal Vs. Then, the arithmetic circuit 120 performs arithmetic operations to derive the variation rate of the pressure indicative signal Vs. The variation rate of the pressure indicative signals Vs is shown in FIG. 4. When the variation rate reaches a predetermined value, the control signal ordering a harder damping characteristics is outputted to switch the damping mode from SOFT mode to HARD mode, as shown in periods labeled H in FIG. 4. In the shown embodiment, switching from the SOFT mode to the HARD mode is performed by switching the level of the control signal from a HIGH level to a LOW level to deactivate the piezoelectric unit 500. The damping mode is switched back to the SOFT mode from the HARD mode when the variation rate decreases across a zero level Switching from HARD mode to SOFT mode is performed by switching the level of the control signal from LOW level to HIGH level for making the piezoelectric unit 500 active.

On the other hand, during the piston compression stroke, the fluid pressure in the lower working chamber 15 is monitored by the piezoelectric unit 500. The piezoelectric unit 500 then produces the pressure indicative signal Vs. Thereafter, the arithmetic circuit 120 calculates the variation rate of the pressure indicative Vs. When the variation rate derived on the basis of the pressure indicative signal Vs reaches the predetermined value, the control signal Vc is outputted to the piezoelectric unit 500 switching the damping mode from the SOFT mode to HARD mode. Similarly to the expansion mode, the damping mode will be switched back to the SOFT mode when the variation rate decreases across zero.

Figure 5:
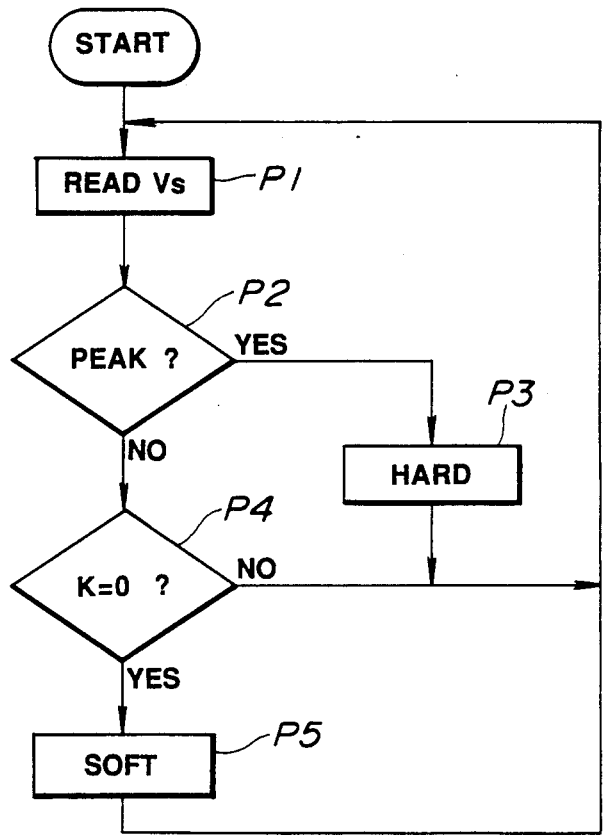
FIG. 5 is a flowchart showing the preferred process of the suspension control to be performed in the preferred embodiment of the suspension system.

FIG. 5 shows a flowchart illustrating the operation performed in the arithmetic circuit. Immediately after starting execution, the pressure indicative signal Vs is read out at a step P1. At the step P1, a variation rate ΔP of the pressure indicative signals Vs is derived. The variation rate ΔP of the pressure to be exerted on the piezoelectric unit 500 becomes maximum at the initial space of the piston expansion and compression stroke and becomes minimum (zero) at the peak of vibration. On the other hand, the piston stroke speed becomes higher according to the increasing of the piston stroke and according to the shortening of the vibration cycle period. Thereafter, by monitoring the variation rate ΔP, the magnitude of input vibration can be detected for quicker response. This may provide higher response characteristics to the input vibration in controlling the suspension mode.

At a step P2, the peak of the variation rate ΔP is detected. When the peak of the variation rate ΔP is detected as checked at the step P2, the control signal Vc ordering HARD mode is outputted to the corresponding piezoelectric unit 500 at a step P3. In practice, the control signal Vc ordering HARD mode has a LOW signal level to the piezoelectric element. Thereafter, in response to the LOW level control signal Vc, the charge applied to the piezoelectric units for maintaining the latter operative is discharged.

Though the shown embodiment switches the damping mode between two stages, i.e. HARD mode and SOFT mode, it is possible to vary the damping characteristics in either or both the HARD and SOFT mode according to the vibration magnitude. Namely, since the distortion magnitude may be essentially linearly proportional to the voltage applied thereto, linear or stepless variation of the damping characteristics can be obtained by linearly or steplessly varying the voltage of the control signal. Practically, it may be possible to vary the control signal voltage according to variation of the variation rate ΔP. Furthermore, it may also be possible to determine the control signal voltage corresponding to the peak level of the variation rate ΔP.

On the other hand, the peak of the variation rate ΔP is not detected as checked at the step P2 or after outputting the HARD mode ordering control signal at the step P3. The check is performed whether it indicates the variation rate is zero, at a step P4. If the variation rate ΔP is greater than zero as checked at the step P8, the process directly goes to END.

On the other hand, when the variation rate ΔP is zero as checked at the step P4, the control signal Vc ordering the SOFT mode is outputted at a step P5. The SOFT mode ordering control signal Vc has a HIGH level sufficient for activating the piezoelectric unit 500.

As will be appreciated from the above, since the shown embodiment can utilizes a common piezoelectric element for adjusting the flow restriction in the piston compression and expansion strokes, the piston can be compact while maintaining the damping force adjusting performance at the equivalent level to the prior proposed ones.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For instance, though the shown embodiment employs a pair of piezoelectric elements for forming the piezoelectric unit, it may be possible to use a single piezoelectric element for performing the equivalent function. Furthermore, though the shown embodiment simply respond to the pressure exerted on the flow restriction valve members regardless of the piston stroke direction, it may be possible to perform further precise or delicate controls by detecting piston stroke direction and varying the damping characteristics of the shock absorber depending upon the piston stroke direction.

What is claimed is:

1. A variable damping characteristics shock absorber comprising:

a hollow cylinder filled with a working fluid;

a piston thrustingly disposed within the internal space of said hollow cylinder for dividing the internal space into first and second fluid chambers, said piston defining a first fluid flow path for fluid communication between said first and second fluid chambers during a piston compression stroke and a second fluid flow path for fluid communication between said first and second fluid chambers during a piston expansion stroke;

a first flow restriction valve associated with said first fluid flow path for restricting fluid flow therethrough and for generating a first damping force against said piston compression stroke;

a second flow restriction valve associated with said second fluid flow path for restricting fluid flow therethrough and for generating a second damping force against said piston expansion stroke;

a piezoelectric actuator disposed between said first and second flow restriction valves for adjusting magnitude of flow restriction for the fluid flow through said first and second fluid flow path depending upon a level of a control signal applied thereto and;

a controller means for deriving the level of said control signal for controlling damping characteristics at a desired damping characteristics.

2. A variable damping characteristics shock absorber as set forth in claim 1, wherein said piezoelectric actuator produces a pressure indicative signal representative of a higher fluid pressure in one of said first and second fluid chambers, and said controller means receives said pressure indicative signal for detecting the mode of vibration in each vibration cycle and derives said control signal level adapted to the detecting vibration mode.

3. A variable damping characteristics shock absorber as set forth in claim 2, which further comprises first and second biasing means respectively associated with said first and second flow restriction valves for resiliently loading a biasing force for placing said first and second flow restriction valves in a closed position in which the fluid communication through said first and second fluid path is blocked, and said piezoelectric actuator is active, on active state, for exerting actuation forces for said first and second flow restriction valves in directions opposite to the directions of the biasing force of said first and second biasing means.

4. A variable damping characteristics shock absorber as set forth in claim 3, wherein said first and second biasing means are associated with first and second adjusting means so that the biasing forces to be exerted on said first and second flow restriction valves are adjusted by means of said first and second adjusting means.

* * * * *